United States Patent [19]

Yeung et al.

[11] Patent Number: 5,696,766
[45] Date of Patent: Dec. 9, 1997

[54] APPARATUS AND METHOD OF SYNCHRONIZING A TRANSMITTER IN A SUBSCRIBER TERMINAL OF A WIRELESS TELECOMMUNICATIONS SYSTEM

[75] Inventors: Joemmane Chi Cheung Yeung, Wellingborough; Ian L. Cooper, Basingstoke, both of United Kingdom

[73] Assignee: DSC Communications Corporation, Plano, Tex.

[21] Appl. No.: 558,445

[22] Filed: Nov. 16, 1995

[30] Foreign Application Priority Data

| Jun. 2, 1995 | [GB] | United Kingdom | 9510870 |
| Jun. 7, 1995 | [GB] | United Kingdom | 9511546 |
| Jun. 28, 1995 | [GB] | United Kingdom | 9513170 |

[51] Int. Cl.$^6$ ............................................. H04J 13/00
[52] U.S. Cl. ................................... 370/515; 375/367
[58] Field of Search ........................ 370/18, 100.1, 370/101, 105.4, 105.5, 107, 208, 209, 320, 335, 504, 514, 515, 520; 455/51.1; 375/200, 205, 208, 209, 210, 354, 365, 367, 366

[56] References Cited

U.S. PATENT DOCUMENTS

| 4,415,900 | 11/1983 | Kaloi | 343/700 MS |
| 4,561,089 | 12/1985 | Rouse et al. | 370/18 |
| 4,737,975 | 4/1988 | Shafer | 379/58 |
| 4,763,324 | 8/1988 | Schwierz | 370/100 |
| 4,777,653 | 10/1988 | Bonnerot et al. | 455/69 |
| 4,801,934 | 1/1989 | Herkert | 340/825.02 |
| 4,864,565 | 9/1989 | Schuster et al. | 370/105.1 |
| 4,984,247 | 1/1991 | Kaufmann et al. | 375/1 |
| 5,020,055 | 5/1991 | May, Jr. | 370/94.1 |
| 5,103,459 | 4/1992 | Gilhousen et al. | 375/1 |
| 5,111,478 | 5/1992 | McDonald | 375/1 |
| 5,189,674 | 2/1993 | Shimizu | 371/20.1 |
| 5,220,335 | 6/1993 | Huang | 343/700 MS |
| 5,235,615 | 8/1993 | Omura | 375/1 |
| 5,237,586 | 8/1993 | Bottomley | 375/1 |
| 5,289,470 | 2/1994 | Chang et al. | 370/94.1 |
| 5,295,152 | 3/1994 | Gudmundson et al. | 375/1 |
| 5,404,376 | 4/1995 | Dent | 375/200 |
| 5,450,425 | 9/1995 | Gunn et al. | 371/67.1 |

FOREIGN PATENT DOCUMENTS

| 0097028 | 12/1983 | European Pat. Off. |
| 0240821 | 10/1987 | European Pat. Off. |
| 0364189 | 4/1990 | European Pat. Off. |
| 0529207 | 3/1993 | European Pat. Off. |
| 0565507 | 10/1993 | European Pat. Off. |
| 0582537 | 2/1994 | European Pat. Off. |
| 2132454 | 7/1984 | United Kingdom. |
| 2172775 | 9/1986 | United Kingdom. |
| 2222504 | 3/1990 | United Kingdom. |
| 2229320 | 9/1990 | United Kingdom. |

(List continued on next page.)

*Primary Examiner*—Douglas W. Olms
*Assistant Examiner*—Ajit Patel
*Attorney, Agent, or Firm*—Baker & Botts, L.L.P.

[57] ABSTRACT

A wireless telecommunications system (1) includes a central terminal (10) for transmitting and receiving radio frequency signals to and from a subscriber terminal (20). A downlink communication path is established from a transmitter (200) of the central terminal (10) to a receiver (202) of the subscriber terminal (20). A downlink signal (212) is transmitted from the transmitter (200) to the receiver (202) during setup and operation of the wireless telecommunications system (1). The downlink signal (212) includes an overhead channel (224) having a code synchronization signal (234). The code synchronization signal (234) is capable of adjusting a phase of a transmitter (204) in the subscriber terminal (20). A receiver (206) in the central terminal (10) monitors an uplink signal (214) transmitted by the transmitter (204) in the subscriber terminal and provides changes to the code synchronization signal (234) such that the transmitter (204) is synchronized to the receiver (206). Synchronization of the transmitter (204) in the subscriber terminal (20) to the receiver (206) in the central terminal (10) facilitates establishment of an uplink communication path from the subscriber terminal (20) to the central terminal (10).

25 Claims, 13 Drawing Sheets

FOREIGN PATENT DOCUMENTS

| | | |
|---|---|---|
| 2241851 | 9/1991 | United Kingdom . |
| 2243267 | 10/1991 | United Kingdom . |
| 2248007 | 3/1992 | United Kingdom . |
| 2264375 | 8/1993 | United Kingdom . |
| 2268293 | 1/1994 | United Kingdom . |
| 2272610 | 5/1994 | United Kingdom . |
| 2277425 | 10/1994 | United Kingdom . |
| 2278260 | 11/1994 | United Kingdom . |
| 2282510 | 4/1995 | United Kingdom . |
| 2286317 | 8/1995 | United Kingdom . |
| 2287379 | 9/1995 | United Kingdom . |
| 8707408 | 12/1987 | WIPO . |
| 8907377 | 8/1989 | WIPO . |
| 9013962 | 11/1990 | WIPO . |
| 9307702 | 4/1993 | WIPO . |
| 9421057 | 9/1994 | WIPO . |
| 9502950 | 1/1995 | WIPO . |
| 9517785 | 6/1995 | WIPO . |

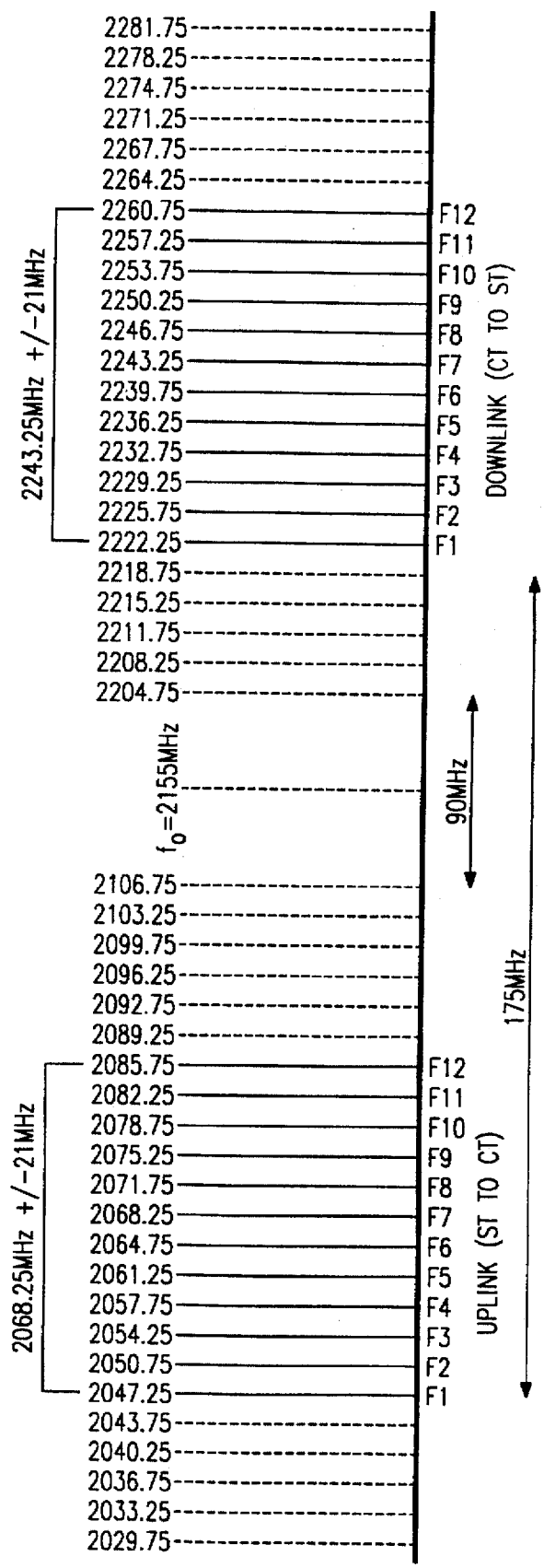

RLT EPLD-DSP Interface Map

F000 (WR)-     PC Control Byte

| B7 | B6 | B5 | B4 | B3 | B2 | B1 | B0 |
|----|----|----|----|----|----|----|----|

B7..B0

| | | |
|---|---|---|
| 0C3H | Coarse Power Increment (1dB STEP) | High Rate |
| 0CCH | Coarse Power Decrement (1dB STEP) | High Rate |
| 0C0H | No change | High Rate |
| 0C5H | Fine Power Increment (0.1dB Step) | High Rate |
| 0CAH | Fine Power Decrement (0.1dB Step) | High Rate |
| 063H | Coarse Power Increment (1dB STEP) | Low Rate |
| 06CH | Coarse Power Decrement (1dB STEP) | Low Rate |
| 060H | No change | Low Rate |
| 065H | Fine Power Increment (0.1dB Step) | Low Rate |
| 06AH | Fine Power Decrement (0.1dB Step) | Low Rate |
| 03CH | Reset to minimum power output | |
| 0A5H | set to nominal power mode (using NVRAM value) | |

*NOTE: bit reversal takes place at the RNU, to decode the command bit reversed data must be used.

FIG. 15

CS Control Byte

| B7 | B6 | B5 | B4 | B3 | B2 | B1 | B0 |

B7..B0

| | | |
|---|---|---|
| 00AH | Fine Advance 1/16 step | High Rate, No Link |
| 005H | Fine Delay 1/16 step | High Rate, No Link |
| 003H | Coarse Advance 1/2 step | High Rate, No Link |
| 00CH | Coarse Delay 1/2 step | High Rate, No Link |
| 000H | No change | High Rate, No Link |
| 006H | Set RNU to AUTO frame mode | High Rate, No Link |
| 00FH | Reset RNU TX EPLD clock chain | High Rate, No Link |
| 02AH | Fine Advance 1/16 step | LOW Rate, No Link |
| 025H | Fine Delay 1/16 step | LOW Rate, No Link |
| 023H | Coarse Advance 1/2 step | LOW Rate, No Link |
| 02CH | Coarse Delay 1/2 step | LOW Rate, No Link |
| 020H | No change | LOW Rate, No Link |
| 026H | Set RNU to AUTO frame mode | LOW Rate, No Link |
| 02FH | Reset RNU TX EPLD clock chain | LOW Rate, No Link |
| 08AH | Fine Advance 1/16 step | High Rate, Link Up |
| 085H | Fine Delay 1/16 step | High Rate, Link Up |
| 083H | Coarse Advance 1/2 step | High Rate, Link Up |
| 08CH | Coarse Delay 1/2 step | High Rate, Link Up |
| 080H | No change | High Rate, Link Up |
| 086H | Set RNU to AUTO frame mode | High Rate, Link Up |
| 08FH | Reset RNU TX EPLD clock chain | High Rate, Link Up |

*FIG. 16*

APPARATUS AND METHOD OF SYNCHRONIZING A TRANSMITTER IN A SUBSCRIBER TERMINAL OF A WIRELESS TELECOMMUNICATIONS SYSTEM

TECHNICAL FIELD OF THE INVENTION

The present invention relates in general to telecommunication systems and more particularly to an apparatus and method of synchronizing a transmitter in a subscriber terminal of a wireless telecommunications network.

BACKGROUND OF THE INVENTION

Wireless telecommunications systems use transmitters and receivers to send and receive information over radio frequency signals in a telephone-like network configuration. Transmitters typically transmit signals at one phase and receivers typically receive signals at a different phase. The different phases used by transmitters and receivers in the system may cause problems in recognizing information from multiple transmitter and receiver pairs. Further, a receiver having one phase requires a greater amount of circuitry and software support to identify information from a corresponding transmitter operating at a different phase. Additionally, a phase difference between a receiver and transmitter may also be affected by changes in a path delay between the transmitter and the receiver. Therefore, it is desirable to be able to control the phase of transmitters and receivers in a wireless telecommunications system to provide improved radio frequency signal transmission.

SUMMARY OF THE INVENTION

An object of the present invention is to provide an apparatus and method of synchronizing a transmitter in a subscriber terminal of a wireless telecommunications system that substantially eliminates or reduces disadvantages and problems associated with conventional wireless communication techniques.

In accordance with one aspect of the present invention, there is provided a method of synchronizing a transmitter in a subscriber terminal of a wireless telecommunications system, comprising the steps of: establishing a downlink communication path from a central terminal to the subscriber terminal; transmitting from a transmitter in the central terminal a downlink signal; receiving at a receiver in the subscriber terminal the downlink signal; identifying a code synchronization signal within the downlink signal; adjusting a phase of the transmitter in the subscriber terminal in response to the code synchronization signal; establishing an uplink communication path in response to the phase of the transmitter in the subscriber unit being equivalent to a phase of the receiver in the central terminal.

In accordance with another aspect of the invention, there is provided a system for synchronizing communications in a wireless communications system, comprising: a transmitter in a central terminal operable to transmit a downlink signal, the downlink signal including a code synchronization signal; a receiver in a subscriber terminal operable to receive the downlink signal, the receiver in the subscriber terminal operable to extract the code synchronization signal from the downlink signal; a transmitter in the subscriber terminal operable to transmit an uplink signal, the transmitter in the subscriber terminal operable to receive the code synchronization signal from the receiver in the subscriber terminal, the code synchronization signal operable to adjust a phase of the uplink signal; a receiver in the central terminal operable to receive the uplink signal, the receiver in the subscriber terminal operable to compare its receiver phase to the phase of the uplink signal to determine a match between the receiver phase and the phase of the uplink signal, the receiver in the subscriber terminal operable to set a value for the code synchronization signal in order to obtain a match of the phase of the uplink signal to the receiver phase.

In accordance with a further aspect of the invention, there is provided a subscriber terminal in a wireless telecommunications system, comprising: a receiver operable to receive a downlink signal, the downlink signal including a code synchronization signal, the receiver operable to extract the code synchronization signal from the downlink signal; a transmitter operable to transmit an uplink signal, the transmitter operable to receive the code synchronization signal, the code synchronization signal operable to adjust a phase of the uplink signal.

According to an embodiment of the present invention, a method of synchronizing a transmitter in a subscriber terminal of a wireless telecommunications system includes establishing a downlink communication path from a central terminal to the subscriber terminal. A downlink signal is transmitted from a transmitter in the central terminal and received at a receiver of the subscriber terminal. The receiver of the subscriber terminal extracts a code synchronization signal from the downlink signal. The code synchronization signal is used to adjust a phase of an uplink signal transmitted by a transmitter in the subscriber terminal. The receiver of the central terminal monitors the phase of the uplink signal and changes the code synchronization signal in order to obtain a match of the phase of the uplink signal to the phase at the receiver of the central terminal.

The present invention provides various technical advantages over conventional wireless communication techniques. For example, one technical advantage is to remotely adjust a transmitting phase of a transmitter in a subscriber terminal. Another technical advantage is to obtain a match of the transmitting phase of the transmitter in a subscriber terminal at a receiver of a central terminal. Yet another technical advantage is to embed a code synchronization signal within a downlink signal transmitted from a central terminal to incrementally adjust a transmitting phase of a transmitter in a subscriber terminal. Still another technical advantage is to continually monitor a transmitting phase of a transmitter in a subscriber terminal in order to maintain a match with the phase of a receiver in a central terminal. Other technical advantages are readily apparent to one skilled in the art from the following figures, description, and claims.

BRIEF DESCRIPTION OF THE DRAWINGS

An embodiment of the invention will be described hereinafter, by way of example only, with reference to the accompanying drawings in which like reference signs are used for like features and in which:

FIG. 4 is an illustration of an example of a frequency plan for the telecommunications system of FIG. 1;

FIG. 15 is a tabular depiction of a power control signal in an overhead channel of the downlink signal;

FIG. 16 is a tabular depiction of a code synchronization signal in the overhead channel of the downlink signal;

DETAILED DESCRIPTION OF THE INVENTION

Figure 1:
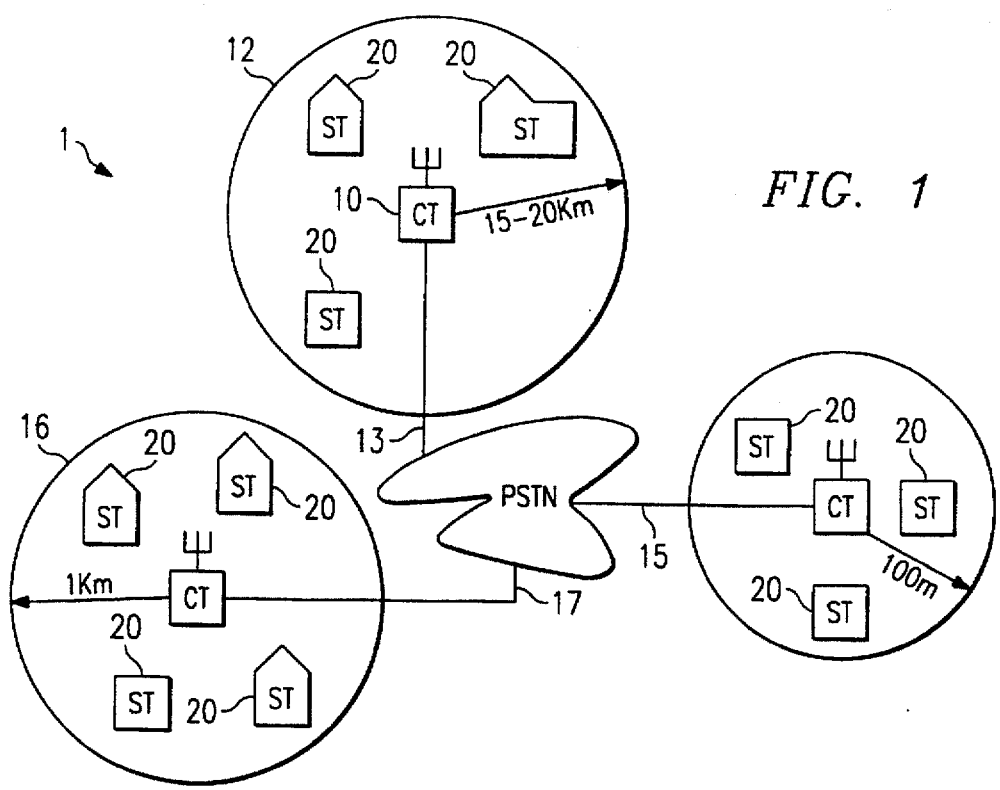
FIG. 1 is a schematic overview of an example of a wireless telecommunications system in which an example of the present invention is included.

FIG. 1 is a schematic overview of an example of a wireless telecommunications system. The telecommunications system includes one or more service areas 12, 14 and 16, each of which is served by a respective central terminal (CT) 10 which establishes a radio link with subscriber terminals (ST) 20 within the area concerned. The area which is covered by a central terminal 10 can vary. For example, in a rural area with a low density of subscribers, a service area 12 could cover an area with a radius of 15–20 Km. A service area 14 in an urban environment where is there is a high density of subscriber terminals 20 might only cover an area with a radius of the order of 100 m. In a suburban area with an intermediate density of subscriber terminals, a service area 16 might cover an area with a radius of the order of 1 Km. It will be appreciated that the area covered by a particular central terminal 10 can be chosen to suit the local requirements of expected or actual subscriber density, local geographic considerations, etc, and is not limited to the examples illustrated in FIG. 1. Moreover, the coverage need not be, and typically will not be circular in extent due to antenna design considerations, geographical factors, buildings and so on, which will affect the distribution of transmitted signals.

The central terminals 10 for respective service areas 12, 14, 16 can be connected to each other by means of links 13, 15 and 17 which interface, for example, with a public switched telephone network (PSTN) 18. The links can include conventional telecommunications technology using copper wires, optical fibres, satellites, microwaves, etc.

The wireless telecommunications system of FIG. 1 is based on providing fixed microwave links between subscriber terminals 20 at fixed locations within a service area (e.g., 12, 14, 16) and the central terminal 10 for that service area. In a preferred embodiment each subscriber terminal 20 is provided with a permanent fixed access link to its central terminal 10. However, in alternative embodiments demand-based access could be provided, so that the number of subscribers which can be serviced exceeds the number of telecommunications links which can currently be active.

Figure 2:
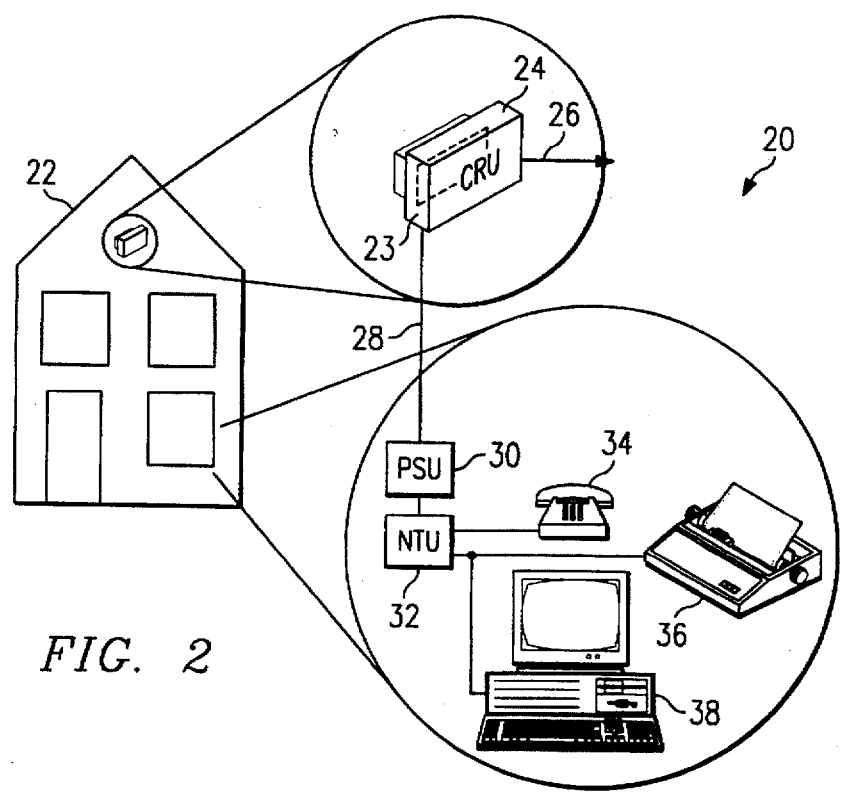
FIG. 2 is a schematic illustration of an example of a subscriber terminal of the telecommunications system of FIG. 1.

FIG. 2 illustrates an example of a configuration for a subscriber terminal 20 for the telecommunications system of FIG. 1. FIG. 2 includes a schematic representation of customer premises 22. A customer radio unit (CRU) 24 is mounted on the customer's premises. The customer radio unit 24 includes a flat panel antenna or the like 23. The customer radio unit is mounted at a location on the customer's premises, or on a mast, etc., and in an orientation such that the flat panel antenna 23 within the customer radio unit 24 faces in the direction 26 of the central terminal 10 for the service area in which the customer radio unit 24 is located.

The customer radio unit 24 is connected via a drop line 28 to a power supply unit (PSU) 30 within the customer's premises. The power supply unit 30 is connected to the local power supply for providing power to the customer radio unit 24 and a network terminal unit (NTU) 32. The customer radio unit 24 is also connected to via the power supply unit 30 to the network terminal unit 32, which in turn is connected to telecommunications equipment in the customer's premises, for example to one or more telephones 34, facsimile machines 36 and computers 38. The telecommunications equipment is represented as being within a single customer's premises. However, this need not be the case, as the subscriber terminal 20 preferably supports either a single or a dual line, so that two subscriber lines could be supported by a single subscriber terminal 20. The subscriber terminal 20 can also be arranged to support analogue and digital telecommunications, for example analogue communications at 16, 32 or 64 kbits/sec or digital communications in accordance with the ISDN BRA standard.

Figure 3:
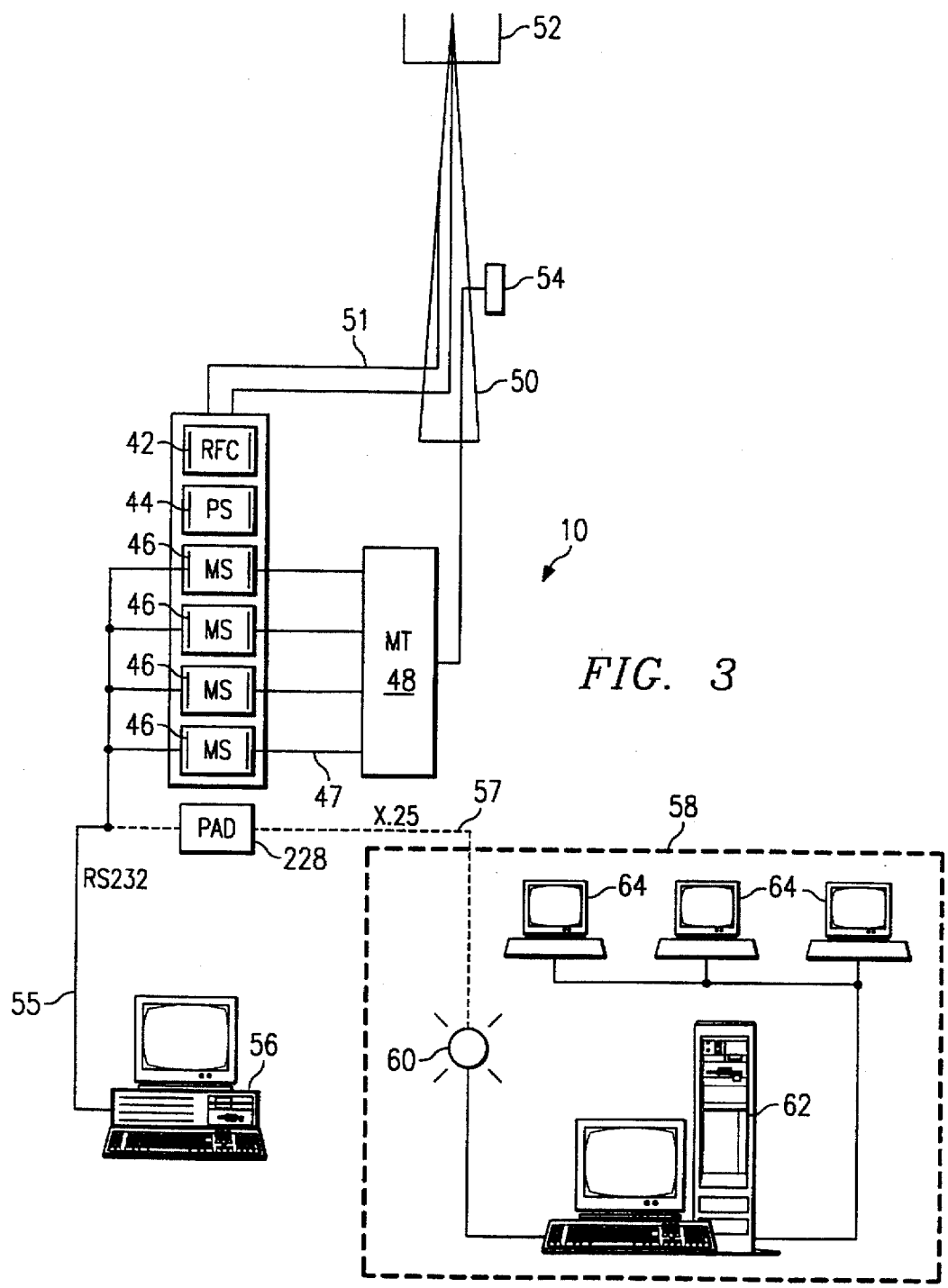
FIG. 3 is a schematic illustration of an example of a central terminal of the telecommunications system of FIG. 1.

FIG. 3 is a schematic illustration of an example of a central terminal of the telecommunications system of FIG. 1. The common equipment rack 40 comprises a number of equipment shelves 42, 44, 46, including a RF Combiner and power amp shelf (RFC) 42, a Power Supply shelf (PS) 44 and a number of (in this example four) Modem Shelves (MS) 46. The RF combiner shelf 42 allows the four modem shelves 46 to operate in parallel. It combines and amplifies the power of four transmit signals, each from a respective one of the four modem shelves, and amplifies and splits received signals four way so that separate signals may be passed to the respective modem shelves. The power supply shelf 44 provides a connection to the local power supply and fusing for the various components in the common equipment rack 40. A bidirectional connection extends between the RF combiner shelf 42 and the main central terminal antenna 52, typically an omnidirectional antenna, mounted on a central terminal mast 50.

This example of a central terminal 10 is connected via a point-to-point microwave link to a location where an interface to the public switched telephone network 18, shown schematically in FIG. 1, is made. As mentioned above, other types of connections (e.g., copper wires or optical fibres) can be used to link the central terminal 10 to the public switched telephone network 18. In this example the modem shelves are connected via lines 47 to a microwave terminal (MT) 48. A microwave link 49 extends from the microwave terminal 48 to a point-to-point microwave antenna 54 mounted on the mast 50 for a host connection to the public switched telephone network 18.

A personal computer, workstation or the like can be provided as a site controller (SC) 56 for supporting the central terminal 10. The site controller 56 can be connected to each modem shelf of the central terminal 10 via, for example, RS232 connections 55. The site controller 56 can then provide support functions such as the localization of faults, alarms and status and the configuring of the central terminal 10. A site controller 56 will typically support a single central terminal 10, although a plurality of site controllers 56 could be networked for supporting a plurality of central terminals 10.

As an alternative to the RS232 connections 55, which extend to a site controller 56, data connections such as an X.25 links 57 (shown with dashed lines in FIG. 3) could instead be provided from a pad 228 to a switching node 60 of an element manager (EM) 58. An element manager 58 can support a number of distributed central terminals 10 connected by respective connections to the switching node 60. The element manager 58 enables a potentially large number (e.g., up to, or more than 1000) of central terminals 10 to be integrated into a management network. The element manager 58 is based around a powerful workstation 62 and can include a number of computer terminals 64 for network engineers and control personnel.

Figure 3A:
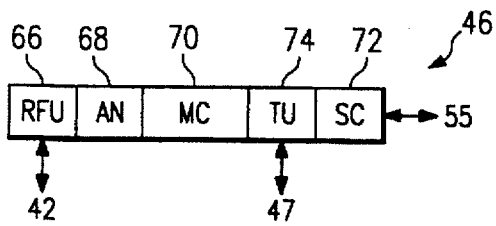
FIG. 3A is a schematic illustration of a modem shelf of a central terminal of the telecommunications system of FIG. 1.

FIG. 3A illustrates various parts of a modem shelf 46. A transmit/receive RF unit (RFU—for example implemented on a card in the modem shelf) 66 generates the modulated transmit RF signals at medium power levels and recovers and amplifies the baseband RF signals for the subscriber terminals. The RF unit 66 is connected to an analogue card (AN) 68 which performs A-D/D-A conversions, baseband filtering and the vector summation of 15 transmitted signals from the modem cards (MCs) 70. The analogue unit 68 is connected to a number of (typically 1–8) modem cards 70. The modem cards perform the baseband signal processing of the transmit and receive signals to/from the subscriber terminals 20. This includes 1/2 rate convolution coding and ×16 spreading with CDMA codes on the transmit signals, and synchronization recovery, despreading and error correction on the receive signals. Each modem card 70 in the present example has two modems, each modem supporting one subscriber link (or two lines) to a subscriber terminal 20. Thus, with two modems per card and 8 modems per modem shelf, each modem shelf could support 16 possible subscriber links. However, in order to incorporate redundancy so that a modem may be substituted in a subscriber link when a fault occurs, only up to 15 subscriber links are preferably supported by a single modem shelf 46. The 16th modem is then used as a spare which can be switched in if a failure of one of the other 15 modems occurs. The modem cards 70 are connected to the tributary unit (TU) 74 which terminates the connection to the host public switched telephone network 18 (e.g., via one of the lines 47) and handles the signaling of telephony information to, for example, up to 15 subscriber terminals (each via a respective one of 15 of the 16 modems).

The wireless telecommunications between a central terminal 10 and the subscriber terminals 20 could operate on various frequencies. FIG. 4 illustrates one possible example of the frequencies which could be used. In the present example, the wireless telecommunication system is intended to operate in the 1.5–2.5 GHz Band. In particular the present example is intended to operate in the Band defined by ITU-R (CCIR) Recommendation F.701 (2025–2110 MHz, 2200–2290 MHz). FIG. 4 illustrates the frequencies used for the uplink from the subscriber terminals 20 to the central terminal 10 and for the downlink from the central terminal 10 to the subscriber terminals 20. It will be noted that 12 uplink and 12 downlink radio channels of 3.5 MHz each are provided centred about 2155 MHz. The spacing between the receive and transmit channels exceeds the required minimum spacing of 70 MHz.

In the present example, as mentioned above, each modem shelf will support 1 frequency channel (i.e. one uplink frequency plus the corresponding downlink frequency). Up to 15 subscriber links may be supported on one frequency channel, as will be explained later. Thus, in the present embodiment, each central terminal 10 can support 60 links, or 120 lines.

Typically, the radio traffic from a particular central terminal 10 will extend into the area covered by a neighboring central terminal 10. To avoid, or at least to reduce interference problems caused by adjoining areas, only a limited number of the available frequencies will be used by any given central terminal 10.

Figure 5A:
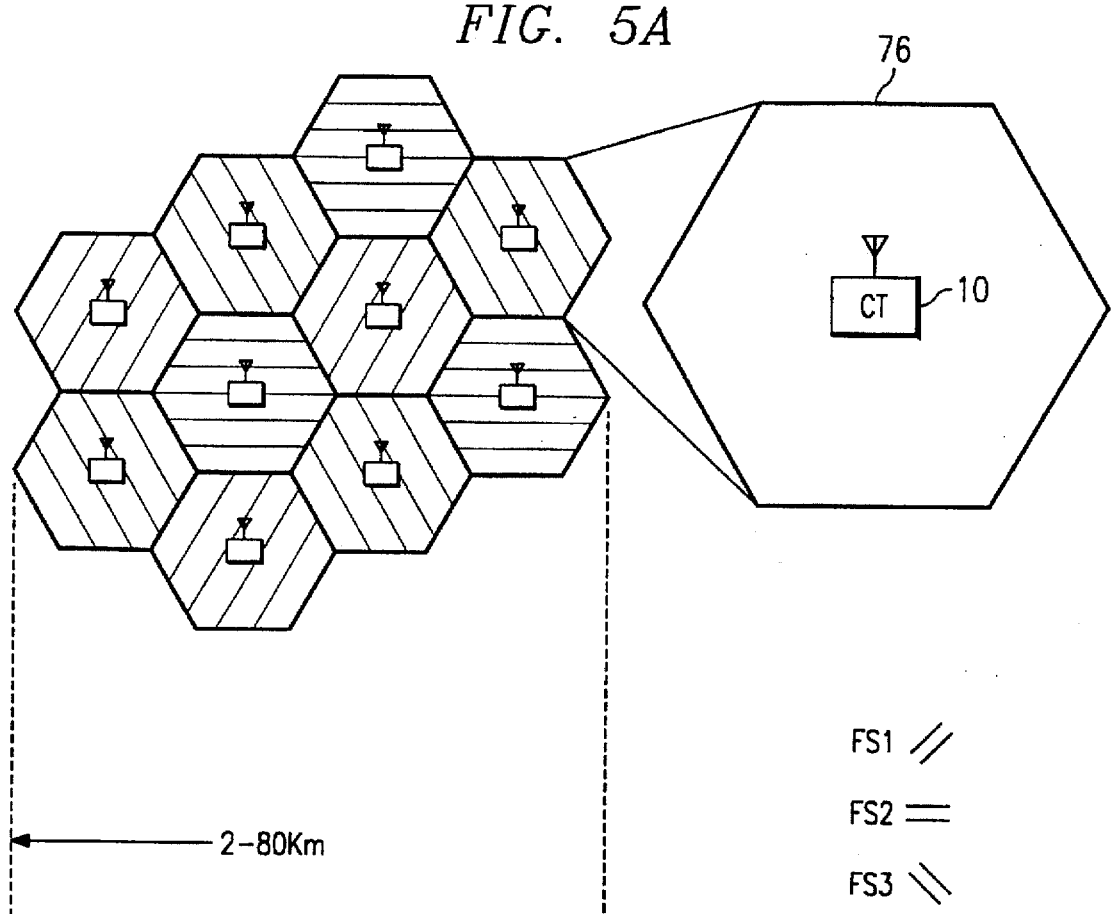
FIGS. 5A and 5B are schematic diagrams illustrating possible configurations for cells for the telecommunications system of FIG. 1.

FIG. 5A illustrates one cellular type arrangement of the frequencies to mitigate interference problems between adjacent central terminals 10. In the arrangement illustrated in FIG. 5A, the hatch lines for the cells 76 illustrate a frequency set (FS) for the cells. By selecting three frequency sets (e.g., where: FS1=F1, F4, F7, F10; FS2=F2, F5, F8, F11; FS3=F3, F6, F9, F12), and arranging that immediately adjacent cells do not use the same frequency set (see, for example, the arrangement shown in FIG. 5A), it is possible to provide an array of fixed assignment omnidirectional cells where interference between nearby cells can be avoided. The transmitter power of each central terminal 10 is set such that transmissions do not extend as far as the nearest cell which is using the same frequency set. Thus each central terminal 10 can use the four frequency pairs (for the uplink and downlink, respectively) within its cell, each modem shelf in the central terminal 10 being associated with a respective RF channel (channel frequency pair).

Figure 5B:
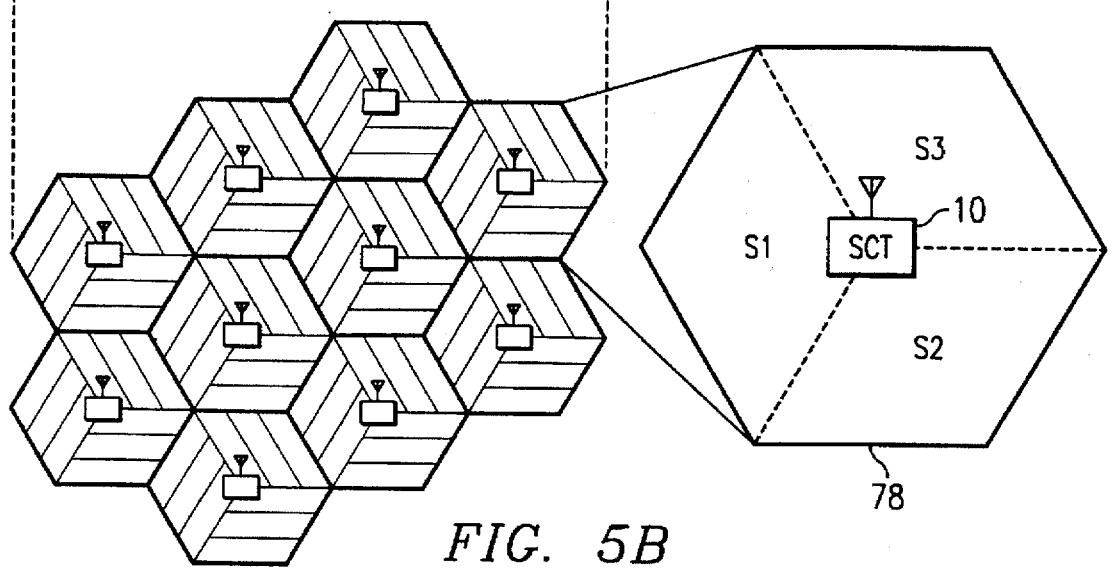

With each modem shelf supporting one channel frequency (with 15 subscriber links per channel frequency) and four modem shelves, each central terminal 10 will support 60 subscriber links (i.e., 120 lines). The 10 cell arrangement in FIG. 5A can therefore support up to 600 ISDN links or 1200 analogue lines, for example. FIG. 5B illustrates a cellular type arrangement employing sectored cells to mitigate problems between adjacent central terminals 10. As with FIG. 5A, the different type of hatch lines in FIG. 5B illustrate different frequency sets. As in FIG. 5A, FIG. 5B represents three frequency sets (e.g., where: FS1=F1, F4, F7, F10; FS2 =F2, F5, F8, F11; FS3=F3, F6, F9, F12). However, in FIG. 5B the cells are sectored by using a sectored central terminal (SCT) 13 which includes three central terminals 10, one for each sector S1, S2 and S3, with the transmissions for each of the three central terminals 10 being directed to the appropriate sector among S1, S2 and S3. This enables the number of subscribers per cell to be increased three fold, while still providing permanent fixed access for each subscriber terminal 20.

A seven cell repeat pattern is used such that for a cell operating on a given frequency, all six adjacent cells operating on the same frequency are allowed unique PN codes. This prevents adjacent cells from inadvertently decoding data.

Figure 6:
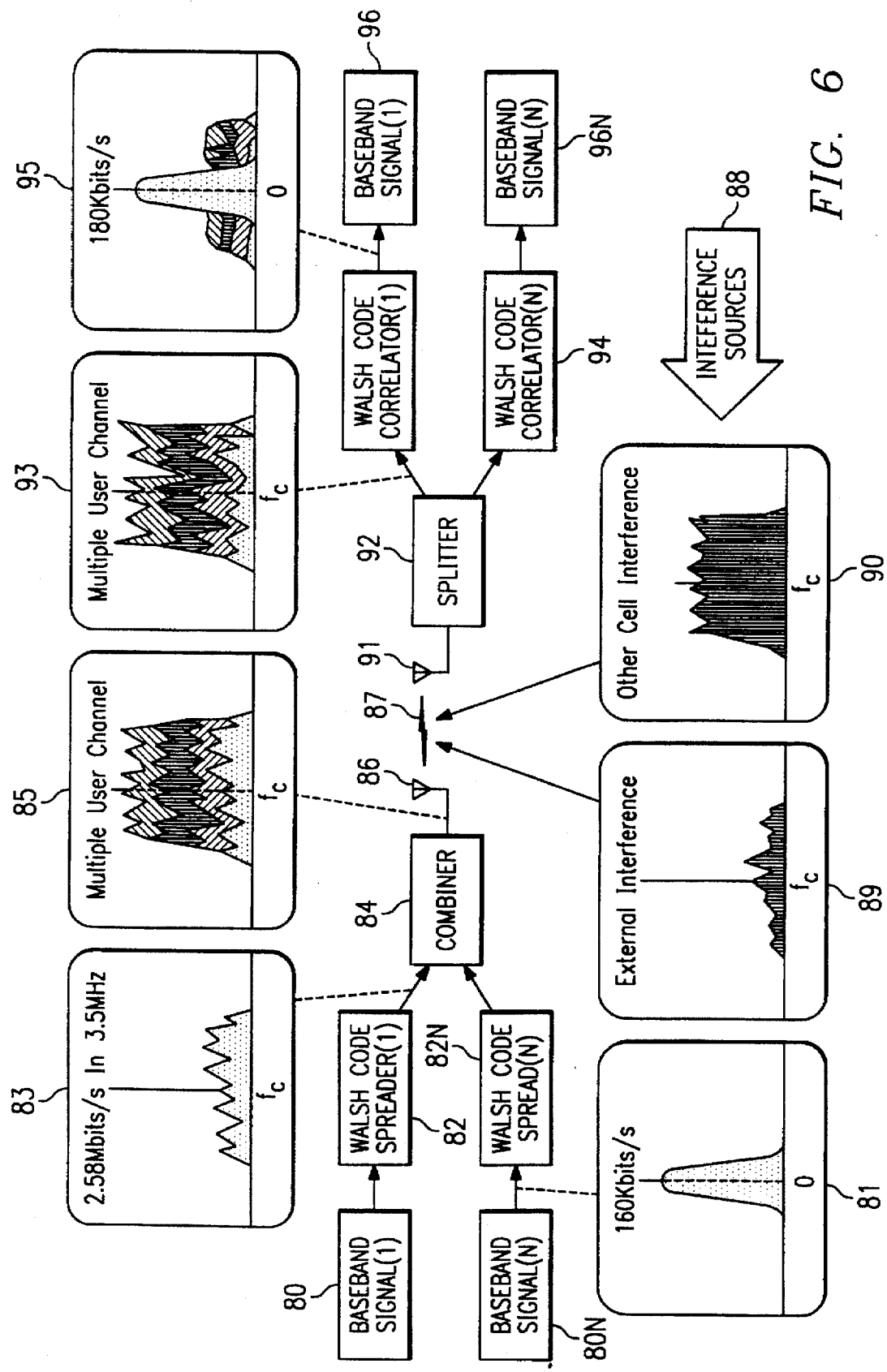
FIG. 6 is a schematic diagram illustrating aspects of a code division multiplex system for the telecommunications system of FIG. 1.

As mentioned above, each channel frequency can support 15 subscriber links. In this example, this is achieved using by multiplexing signals using a Code Division Multiplexed Access (CDMA) technique. FIG. 6 gives a schematic overview of CDMA encoding and decoding.

In order to encode a CDMA signal, base band signals, for example the user signals for each respective subscriber link, are encoded at 80-80N into a 160 ksymbols/sec baseband signal where each symbol represents 2 data bits (see, for example the signal represented at 81). This signal is then spread by a factor of 16 using a respective Walsh pseudo random noise (PN) code spreading function 82-82N to generate signals at an effective chip rate of 2.56 Msymbols/sec in 3.5 MHz. The signals for respective subscriber links are then combined and converted to radio frequency (RF) to give multiple user channel signals (e.g., 85) for transmission from the transmitting antenna 86.

During transmission, a transmitted signal will be subjected to interference sources 88, including external interference 89 and interference from other channels 90. Accordingly, by the time the CDMA signal is received at the receiving antenna 91, the multiple user channel signals may be distorted as is represented at 93.

In order to decode the signals for a given subscriber link from the received multiple user channel, a Walsh correlator 94-94N uses the same pseudo random noise (PN) code that was used for the encoding for each subscriber link to extract a signal (e.g, as represented at 95) for the respective received baseband signal 96-96N. It will be noted that the received signal will include some residual noise. However, unwanted noise can be removed using a low pass filter and signal processing.

The key to CDMA is the application of orthogonal codes that allow the multiple user signals to be transmitted and received on the same frequency at the same time. Once the bit stream is orthogonally isolated using the Walsh codes, the signals for respective subscriber links do not interfere with each other.

Walsh codes are a mathematical set of sequences that have the function of "orthonormality". In other words, if any Walsh code is multiplied by any other Walsh code, the results are zero.

Figure 7:
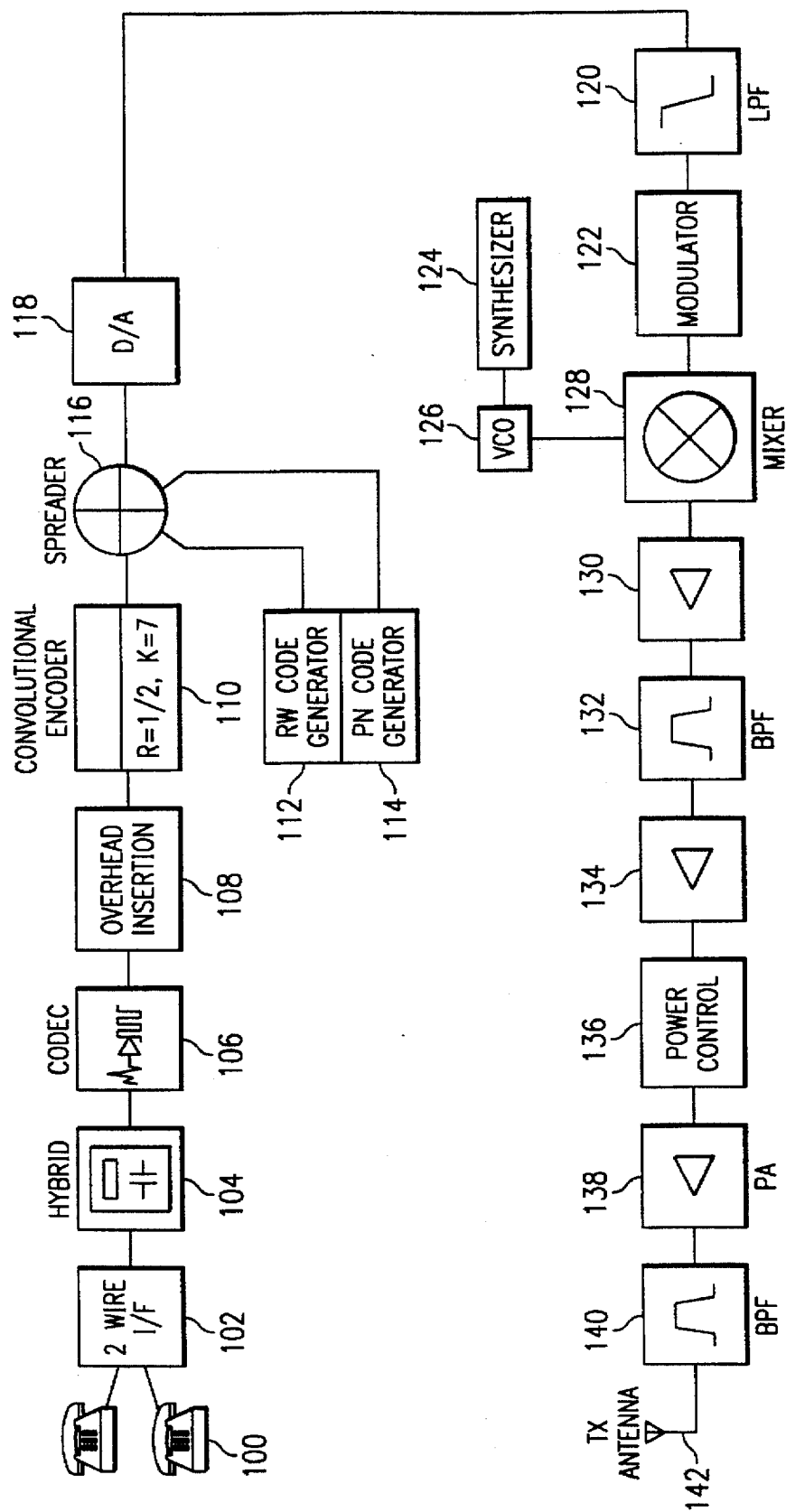
FIG. 7 is a schematic diagram illustrating signal transmission processing stages for the telecommunications system of FIG. 1.

FIG. 7 is a schematic diagram illustrating signal transmission processing stages as configured in a subscriber terminal 20 in the telecommunications system of FIG. 1. The central terminal is also configured to perform equivalent signal transmission processing. In FIG. 7, an analogue signal from one of a pair of telephones is passed via a two-wire interface 102 to a hybrid audio processing circuit 104 and then via a codec 106 to produce a digital signal into which an overhead channel including control information is inserted at 108. The resulting signal is processed by a convolutional encoder 110 before being passed to a spreader 116 to which the Rademacher-Walsh and PN codes are applied by a RW code generator 112 and PN Code generator 114, respectively. The resulting signals are passed via a digital to analogue converter 118. The digital to analogue converter 118 shapes the digital samples into an analogue waveform and provides a stage of baseband power control. The signals are then passed to a low pass filter 120 to be modulated in a modulator 122. The modulated signal from the modulator 122 is mixed with a signal generated by a voltage controlled oscillator 126 which is responsive to a synthesizer 160. The output of the mixer 128 is then amplified in a low noise amplifier 130 before being passed via a band pass filter 132. The output of the band pass filter 132 is further amplified in a further low noise amplifier 134, before being passed to power control circuitry 136. The output of the power control circuitry is further amplified in a further low noise amplifier 138 before being passed via a further band pass filter 140 and transmitted from the transmission antenna 142.

Figure 8:
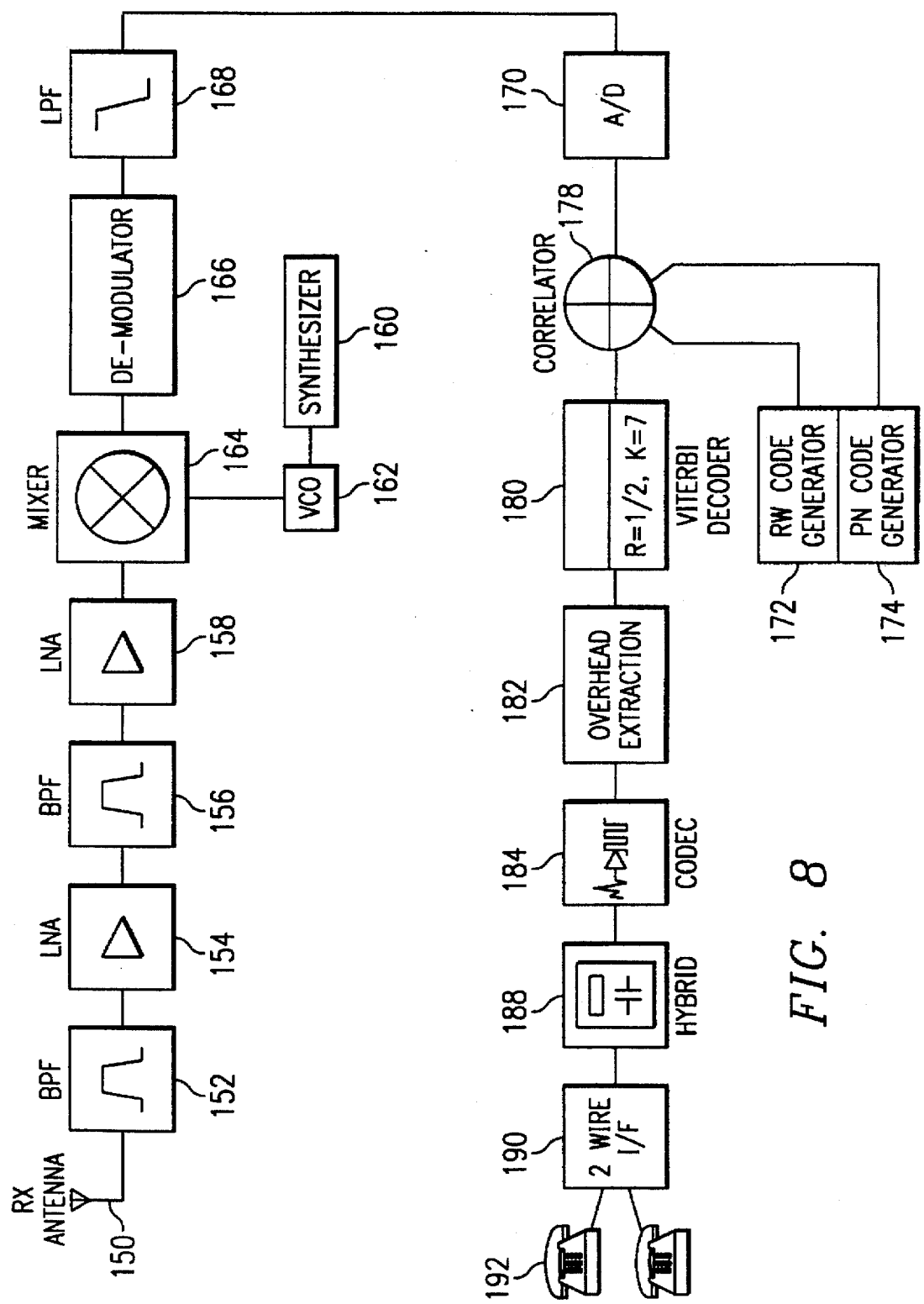
FIG. 8 is a schematic diagram illustrating signal reception processing stages for the telecommunications system of FIG. 1.

FIG. 8 is a schematic diagram illustrating the equivalent signal reception processing stages as configured in a subscriber terminal 20 in the telecommunications system of FIG. 1. The central terminal is also configured to perform equivalent signal reception processing. In FIG. 8, signals received at a receiving antenna 150 are passed via a band pass filter 152 before being amplified in a low noise amplifier 154. The output of the amplifier 154 is then passed via a further band pass filter 156 before being further amplified by a further low noise amplifier 158. The output of the amplifier 158 is then passed to a mixer 164 where it is mixed with a signal generated by a voltage controlled oscillator 162 which is responsive to a synthesizer 160. The output of the mixer 164 is then passed via the de-modulator 166 and a low pass filter 168 before being passed to an analogue to digital converter 170. The digital output of the A/D converter 170 is then passed to a correlator 178, to which the same Rademacher-Walsh and PN codes used during transmission are applied by a RW code generator 172 (corresponding to the RW code generator 112) and a PN code generator 174 (corresponding to PN code generator 114), respectively. The output of the correlator is applied to a Viterbi decoder 180. The output of the Viterbi decoder 180 is then passed to an overhead extractor 182 for extracting the overhead channel information. The output of the overhead extractor 182 is then passed via a codec 184 and a hybrid circuit 188 to a two wire interface 190 where the resulting analogue signals are passed to a selected telephone 192.

At the subscriber terminal 20, a stage of automatic gain control is incorporated at the IF stage. The control signal is derived from the digital portion of the CDMA receiver using the output of a signal quality estimator to be described later.

Figure 9:
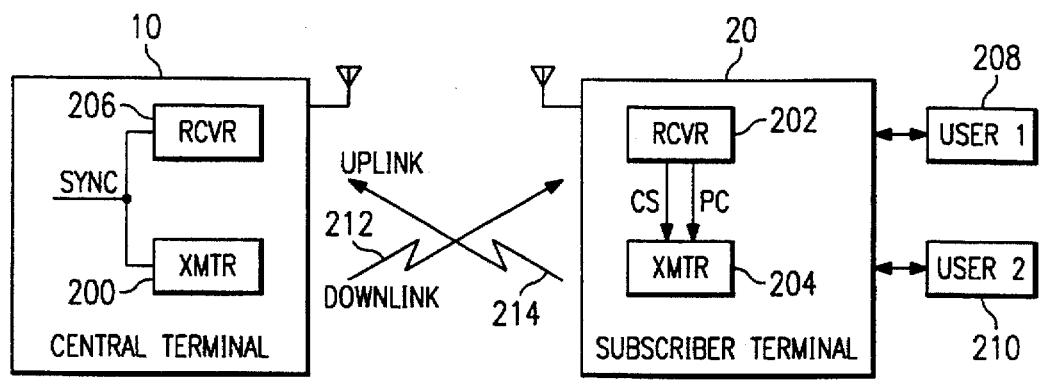
FIG. 9 is a schematic diagram illustrating downlink and uplink communication paths for the wireless telecommunications system.

FIG. 9 is a block diagram of downlink and uplink communication paths between central terminal 10 and subscriber terminal 20. A downlink communication path is established from transmitter 200 in central terminal 10 to receiver 202 in subscriber terminal 20. An uplink communication path is established from transmitter 204 in subscriber terminal 20 to receiver 206 in central terminal 10. Once the downlink and the uplink communication paths have been established in wireless telecommunication system 1, telephone communication may occur between a first user 208 or a second user 210 of subscriber terminal 20 and a user serviced through central terminal 10 over a downlink signal 212 and an uplink signal 214. Downlink signal 212 is transmitted by transmitter 200 of central terminal 10 and received by receiver 202 of subscriber terminal 20. Uplink signal 214 is transmitted by transmitter 204 of subscriber terminal 20 and received by receiver 206 of central terminal 10. Downlink signal 212 and uplink signal 214 are transmitted as CDMA spread spectrum signals.

Figure 10:
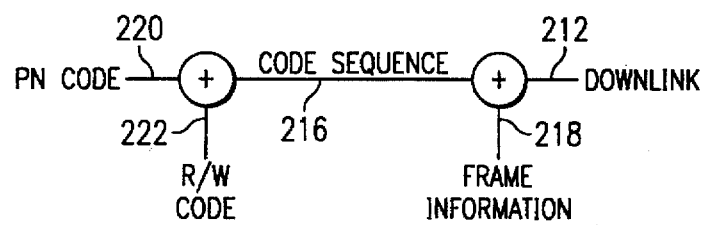
FIG. 10 is a schematic diagram illustrating the makeup of a downlink signal transmitted by the central terminal.

Receiver 206 and transmitter 200 within central terminal 10 are synchronized to each other with respect to time and phase, and aligned as to information boundaries. In order to establish the downlink communication path, receiver 202 in subscriber terminal 20 should be synchronized to transmitter 200 in central terminal 10. Synchronization occurs by performing an acquisition mode function and a tracking mode function on downlink signal 212. Initially, transmitter 200 of central terminal 10 transmits downlink signal 212. FIG. 10 shows the contents of downlink signal 212. Downlink signal 212 includes a code sequence signal 216 for central terminal 10 combined with a frame information signal 218. Code sequence signal 216 is derived from a combination of a pseudo-random noise code signal 220 and a Rademacher-Walsh code signal 222. Although FIG. 10 relates specifically to the makeup of the downlink signal, the uplink has the same makeup.

Each receiver 202 of every subscriber terminal 20 serviced by a single central terminal 10 operate off of the same pseudo-random noise code signal as central terminal 10. Each modem shelf 46 in central terminal 10 supports one radio frequency channel and fifteen subscriber terminals 20, each subscriber terminal having a first user 208 and a second user 210. Each modem shelf 46 selects one of sixteen Rademacher-Walsh code signals 222, each Rademacher-Walsh code signal 222 corresponding to a unique subscriber terminal 20. Thus, a specific subscriber terminal 20 will have an identical code sequence signal 218 as downlink signal 212 transmitted by central terminal 10 and destined for the specific subscriber terminal 20.

Downlink signal 212 is received at receiver 202 of subscriber terminal 20. Receiver 202 compares its phase and code sequence to a phase and code sequence within code sequence signal 216 of downlink signal 212. Central terminal 10 is considered to have a master code sequence and subscriber terminal 20 is considered to have a slave code sequence. Receiver 202 incrementally adjusts the phase of its slave code sequence to recognize a match to master code sequence and place receiver 202 of subscriber terminal 20 in phase with transmitter 200 of central terminal 10. The slave code sequence of receiver 202 is not initially synchronized to the master code sequence of transmitter 200 and central terminal 10 due to the path delay between central terminal 10 and subscriber terminal 20. This path delay is caused by the geographical separation between subscriber terminal 20 and central terminal 10 and other environmental and technical factors affecting wireless transmission.

Figure 11:
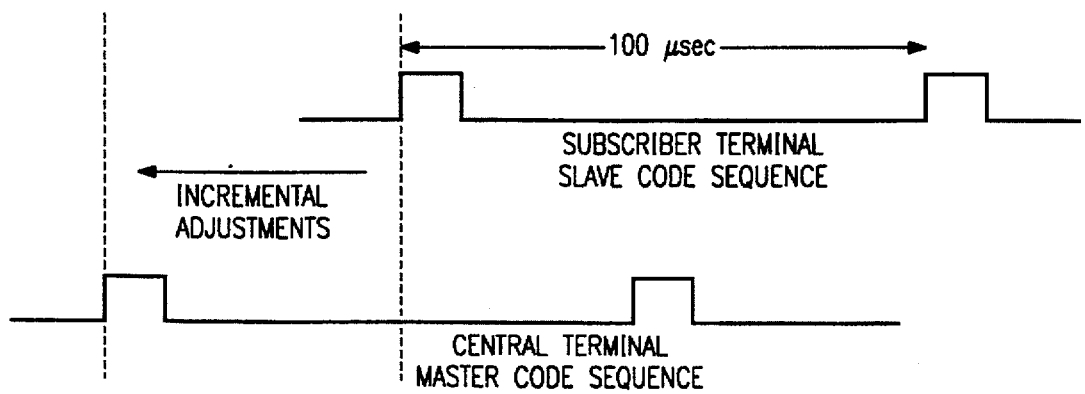
FIG. 11 is a graphical depiction illustrating the phase adjustment to a slave code sequence of the subscriber terminal.

FIG. 11 illustrates how receiver 202 of subscriber terminal 20 adjusts its slave code sequence to match the master code sequence of transmitter 200 in central terminal 10. Receiver 202 increments the phase of the slave code sequence throughout the entire length of the master code sequence within downlink signal 212 and determines a signal quality estimate by performing a power measurement on the combined power of the slave code sequence and the master code sequence for each incremental change in the phase of the slave code sequence. The length of the master code sequence is approximately 100 microseconds based on a chip period of 2.56 MegaHertz. The phase of the slave code sequence is adjusted by one half of a chip period for each incremental interval during the acquisition phase. Receiver 202 completes a first acquisition pass when it identifies a correlation peak where the combined power reaches a maximum value. Receiver 202 performs a second acquisition pass throughout the entire length of the code sequence to verify identification of the maximum value of the combined power at the correlation peak. The approximate path delay between subscriber terminal 20 and central terminal 10 is determined when the correlation peak position is identified in the acquisition mode.

Once acquisition of downlink signal 212 is achieved at receiver 202, fine adjustments are made to the phase of the slave code sequence in order to maintain the phase matching of the slave code sequence with the master code sequence in the tracking mode. Fine adjustments are made through one sixteenth of a chip period incremental changes to the phase of the slave code sequence. Fine adjustments may be performed in either forward (positive) or backward (negative) directions in response to the combined power measurements made by receiver 202. Receiver 202 continuously monitors the master code sequence to ensure that subscriber terminal 20 is synchronized to central terminal 10 for the downlink communication path.

Figure 12:
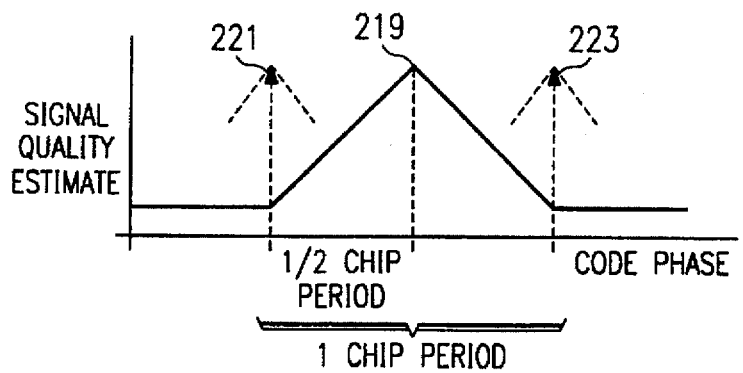
FIG. 12 is a graphical depiction of a signal quality estimate performed by the receiver in the subscriber terminal.

FIG. 12 shows a graph of the combined power curve measured by receiver 202 during the acquisition mode and the tracking mode. The maximum value of the combined power occurs at the correlation peak 219 of the combined power curve. It should be noted that the peak 219 may not be as well defined as in FIG. 12, but may be flattened at the top, more in the form of a plateau. This is the point where the slave code sequence of receiver 202 is in phase with and matches the master code sequence of transmitter 200. Measurements resulting in combined power values that occur off of correlation peak 219 require incremental adjustments to be made to the slave code sequence. A fine adjustment window is established between an early correlator point 221 and a late correlator point 223. An average power measurement is performed at early correlator point 221 and at late correlator point 223. Since early correlator point 221 and late correlator point 223 are spaced one chip period apart, an error signal is produced upon calculating the difference between the average powers of early correlator point 221 and late correlator point 223 that is used to control the fine adjustments to the phase of the slave code sequence.

After acquiring and initiating tracking on the central terminal 10 master code sequence of code sequence signal 216 within downlink signal 212, receiver 202 enters a frame alignment mode in order to establish the downlink communication path. Receiver 202 analyzes frame information within frame information signal 218 of downlink signal 212 to identify a beginning of frame position for downlink signal 212. Since receiver 202 does not know at what point in the data stream of downlink signal 212 it has received information, receiver 202 must search for the beginning of frame position in order to be able to process information received from transmitter 200 of central terminal 10. Once receiver 202 has identified one further beginning of frame position, the downlink communication path has been established from transmitter 200 of central terminal 10 to receiver 202 of subscriber terminal 20.

Figure 13:
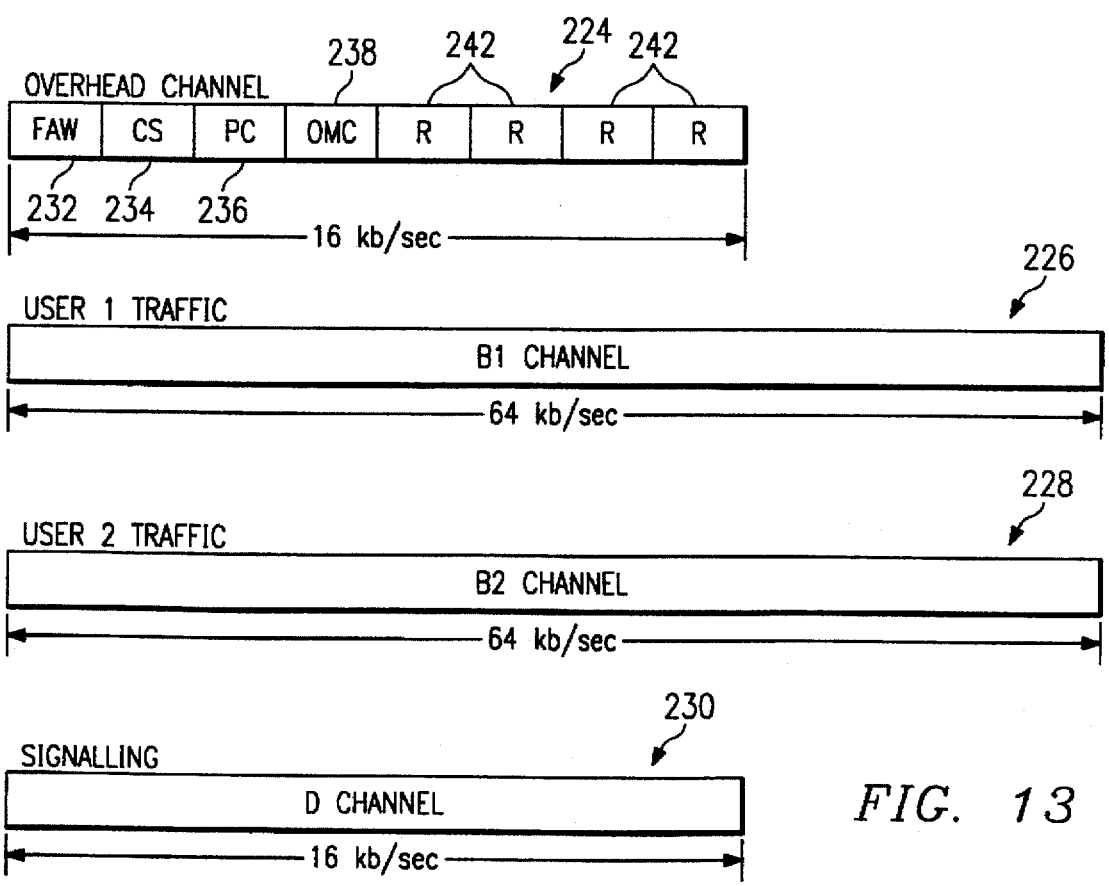
FIG. 13 is a graphical diagram illustrating the contents of a frame information signal within the downlink signal.

FIG. 13 shows the general contents of frame information signal 218. Frame information signal 218 includes an overhead channel 224, a first user channel 226, a second user channel 228, and a signaling channel 230 for each frame of information transported over downlink signal 212. Overhead channel 224 carries control information used to establish and maintain the downlink and uplink communication paths. First user channel 226 is used to transfer traffic information to first user 208. Second user channel 228 is used to transfer traffic information to second user 210. Signaling channel 230 provides the signaling information to supervise operation of subscriber terminal 20 telephony functions. Overhead channel 224 occupies 16 kilobits per second of a frame of information, first user channel 226 occupies 64 kilobits per second of a frame of information, second user channel 228 occupies 64 kilobits per second of a frame of information, and signaling channel 230 occupies 16 kilobits per second of a frame of information.

Figure 14:
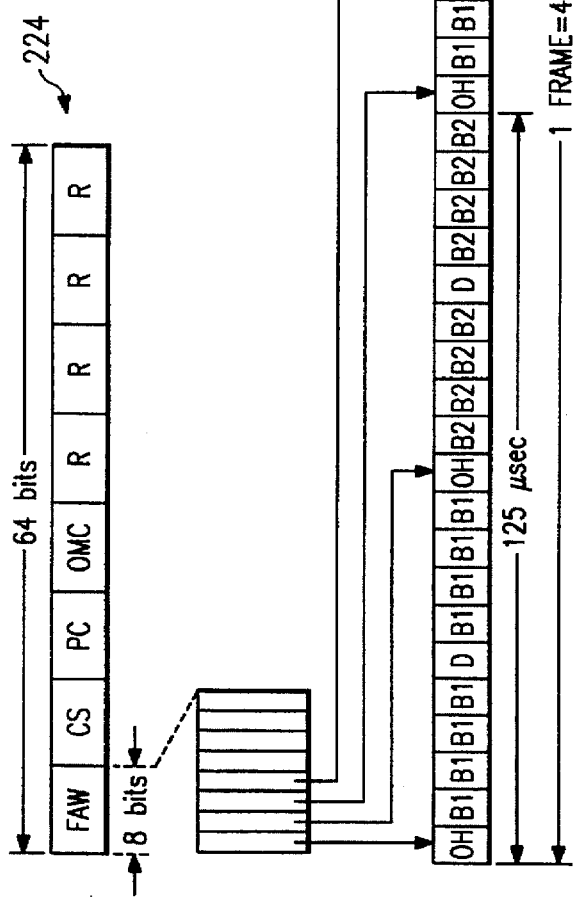
FIG. 14 is a tabular depiction illustrating overhead insertion into a data stream of the downlink signal.

FIG. 14 shows how overhead channel 224 is inserted into the data stream of downlink signal 212. The data stream of downlink signal 212 is partitioned into twenty bit subframes.

Each twenty bit subframe has two ten bit sections. A first ten bit section includes an overhead bit, a signaling bit, and eight first user bits. A second ten bit section includes an overhead bit, a signaling bit, and eight second user bits. This twenty bit subframe format is repeated throughout an entire four millisecond frame of information. Thus, an overhead bit occupies every tenth bit position of frame information in the data stream of downlink signal 212.

Overhead channel 224 includes eight byte fields—a frame alignment word 232, a code synchronization signal 234, a power control signal 236, an operations and maintenance channel signal 238, and four reserved byte fields 242. Frame alignment word 232 identifies the beginning of frame position for its corresponding frame of information. Code synchronization signal 234 provides information to control synchronization of transmitter 204 in subscriber terminal 20 to receiver 206 in central terminal 10. Power control signal 236 provides information to control transmitting power of transmitter 204 in subscriber terminal 20. Operations and maintenance channel signal 238 provides status information with respect to the downlink and uplink communication paths and a path from the central terminal to the subscriber terminal on which the communication protocol which operates on the modem shelf between the shelf controller and the modem cards also extends.

In order to identify two successive beginning of frame positions, receiver 202 of subscriber terminal 20 searches through the ten possible bit positions in the data stream of downlink signal 212 for overhead channel 224 and frame alignment word 232. Receiver 202 initially extracts a first bit position of every ten bit section of frame information to determine if overhead channel 224 has been captured. If frame alignment word 232 has not been identified after a predetermined period of time from the extraction of the first bit position, receiver 202 will repeat this procedure for the second bit position of each ten bit section and subsequent bit positions until frame alignment word 232 has been identified. An example of a frame alignment word 232 which receiver 202 would search for is binary 00010111. Once the correct bit position yields frame alignment word 232, receiver 202 attempts to identify two successive beginning of frame positions. A downlink communication path is established upon the successful identification of two successive beginning of frame positions in response to recognition of successive frame alignment words 232 in the data stream of downlink signal 212.

Receiver 202 continues to monitor the appropriate bit position in order to recognize subsequent frame alignment words 232 for subsequent frames of information. If receiver 202 fails to recognize a frame alignment word 232 for three successive frames, then receiver 202 will return to the search process and cycle through each of the bit positions of the ten bit section until identifying two successive beginning of frame positions through recognition of two successive frame alignment words 232 and reestablishing frame alignment. Failure to recognize three successive frame alignment words 232 may result from a change in the path delay between central terminal 10 and subscriber terminal 20. Receiver 202 will also return to the search process upon an interruption in the downlink communication path from transmitter 200 in central terminal 10 to receiver 202 in subscriber terminal 20.

Upon establishing the downlink communication path from central terminal 10 to subscriber terminal 20 through proper code sequence phase synchronization and frame alignment, wireless telecommunication system 1 performs procedures to establish the uplink communication path from transmitter 204 in subscriber terminal 20 to receiver 206 in central terminal 10. Initially, transmitter 204 is powered off until the downlink communication path has been established to prevent transmitter interference of central terminal communications with other subscriber terminals. After the downlink communication path is established, transmitting power of transmitter 204 is set to a minimum value on command from the central terminal CT via power control channel 236 of overhead channel 224. Power control signal 236 controls the amount of transmitting power produced by transmitter 204 such that central terminal 10 receives approximately the same level of transmitting power from each subscriber terminal 20 serviced by central terminal 10.

Power control signal 236 is transmitted by transmitter 200 of central terminal 10 in overhead channel 224 of frame information signal 218 over downlink signal 212. Receiver 202 of subscriber terminal 20 receives downlink signal 212 and extracts power control signal 236 therefrom. Power control signal 236 is provided to transmitter 204 of subscriber terminal 20 and incrementally adjusts the transmitting power of transmitter 204. Central terminal 10 continues to incrementally adjust the transmitting power of transmitter 204 until the transmitting power falls within a desired threshold range as determined by receiver 206. Adjustments to the transmitting power initially occur in a coarse adjustment mode having one decibel increments until the transmitting power falls within the desired threshold range. Upon turning transmitter 204 on, the transmitting power is gradually ramped up in intensity through incremental adjustments in order to avoid interference of central terminal communications with other subscriber terminals.

FIG. 15 shows an example decoding scheme for power control signal 236. After the transmitting power of transmitter 204 in subscriber terminal 20 reaches the desired threshold range, receiver 206 in central terminal 10 continues to monitor the amount of transmitting power from transmitter 204 for any changes resulting from power fluctuations, and variations in the path delay between central terminal 10 and subscriber terminal 20, et al. If the transmitting power falls below or exceeds the desired threshold range, central terminal 10 will send an appropriate power control signal 236 to increase or decrease the transmitting power of transmitter 204 as needed. At this point, adjustments made to return the transmitting power to the desired threshold range may occur in a fine adjustment mode having 0.1 decibel increments. Upon an interruption in the downlink or uplink communication paths, central terminal 10 may command transmitter 204 to return to a previous transmitting power level through recovery of parameters stored in a memory in subscriber terminal 20 in order to facilitate reestablishment of the appropriate communication path.

To fully establish the uplink communication path from subscriber terminal 20 to central terminal 10, transmitter 204 in subscriber terminal 20 should be synchronized to receiver 206 in central terminal 10. Central terminal 10 controls the synchronization of transmitter 204 through code synchronization signal 234 in overhead channel 224 of frame information signal 218. Code synchronization signal 234 incrementally adjusts a phase of the slave code sequence of transmitter 204 to match the phase of the master code sequence of receiver 206. Synchronization of transmitter 204 is performed in a substantially similar manner as synchronization of receiver 202.

Code synchronization signal 234 is transmitted by transmitter 200 in central terminal 10 in overhead channel 224 of frame information signal 218 over downlink signal 212. Receiver 202 of subscriber terminal 20 receives downlink signal 212 and extracts code synchronization signal 234 therefrom. Code synchronization signal 234 is provided to transmitter 204 for incrementally adjustment of the phase of the slave code sequence of transmitter 204. Central terminal 10 continues to incrementally adjust the phase of the slave code sequence of transmitter 204 until receiver 206 recognizes a code and phase match between the slave code sequence of transmitter 204 and the master code sequence of central terminal 10.

Receiver 206 performs the same power measurement technique in determining a phase and code match for transmitter 204 synchronization as performed for receiver 202 synchronization. Adjustments to the phase of the slave code sequence of transmitter 204 initially occur in a coarse adjustment mode having one half of a chip rate increments until receiver 206 identifies the maximum power position of the combined power of the master code sequence and the slave code sequence of transmitter 204.

FIG. 16 shows an example decoding scheme for code synchronization signal 234. After identification and verification of a phase and code match of the slave code sequence to the master code sequence, receiver 206 continues to monitor uplink signal 214 for changes in the phase of the slave code sequence of transmitter 204 resulting from variations in the path delay between central terminal 10 and subscriber terminal 20. If further adjustments are needed to the phase of the slave code sequence of transmitter 204, central terminal 10 will send appropriate code synchronization signals 234 to increase or decrease the phase of the slave code sequence of transmitter 204 as needed. At this point, adjustments made to the phase of the slave code sequence of transmitter 204 may occur in a fine adjustment mode having one sixteenth of a chip rate increments. Upon an interruption in the downlink or uplink communication paths, central terminal 10 may command transmitter 204 to return to a previous slave code sequence phase value through recovery of parameters stored in a memory in subscriber terminal 20 in order to facilitate reestablishment of the appropriate communication path.

After synchronization of transmitter 204 is achieved, receiver 206 performs frame alignment on uplink signal 214 in a similar manner as frame alignment is performed by receiver 202 during establishment of the downlink communication path. Once receiver 206 recognizes two successive frame alignment words and obtains frame alignment, the uplink communication path has been established. Upon establishing both the downlink and the uplink communication paths, information transfer between first user 208 or second user 210 of subscriber terminal 20 and users coupled to central terminal 10 may commence.

Wireless telecommunication system 1 is capable of adjusting the transmitting power level and the transmit rate to one of two settings for each of three different system operating modes. The system operating modes are acquisition, standby and traffic. Adjustments in the transmitting power and the transmit rate make it possible to reduce and minimize interference with other subscriber terminals. Improvements in link establishment time are also achieved. The transmitting power level is decoded in power control signal 236 and the transmit rate is decoded in code synchronization signal 234.

The transmitting power for both downlink signal 212 and uplink signal 214 can be set to either a nominal 0 decibel high power level or a reduced −12 decibel low power level. The transmit rate for both downlink signal 212 and uplink signal 214 can be set to a low rate of 10 kilobits per second or a high rate of 160 kilobits per second. When switched to the high rate of 160 kilobits per second, user traffic and overhead information are spread such that one information symbol results in the transmission of 16 chips. Correlation is performed over 16 chips, yielding a processing gain of 12 decibels. When switched to the low rate of 10 kilobits per second, only overhead information is spread such that one overhead symbol results in the transmission of 256 chips. Correlation is performed over 256 chips, yielding a processing gain of 24 decibels.

Figure 17:
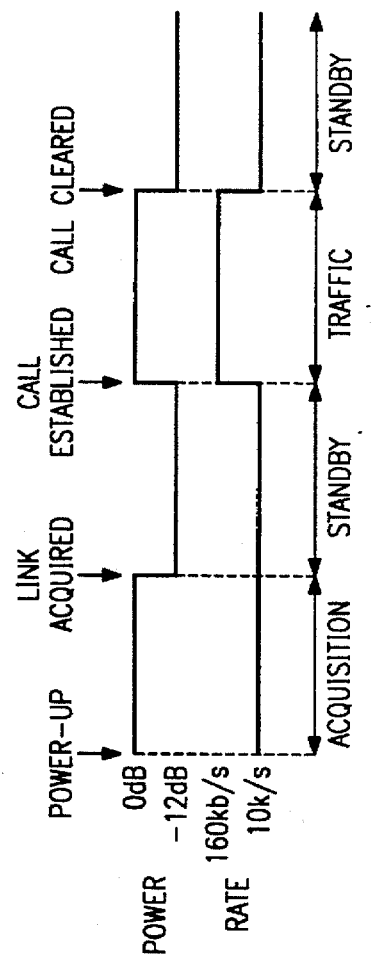
FIG. 17 is a graphical depiction of a transmitting power and a transmit rate for each mode of operation of the wireless telecommunications system.

FIG. 17 show the transmitting power and transmit rate for each of the three system operating modes. At power up or whenever the downlink or uplink communication paths are lost, wireless telecommunication system 1 enters the acquisition mode. During the acquisition mode, the transmitting power of the downlink and uplink transmitters are maximized as well as the correlator processing gain. This maximizes the signal to noise ratio at the correlator output, increasing the amplitude of the correlation peak 219 for easier identification and minimal risk of false acquisition. Since only overhead information is needed in the acquisition mode, the transmit rate is at the low rate level of 10 kilobits per second.

When the downlink and the uplink communication paths are acquired, wireless telecommunication system 1 enters the standby mode. In the standby mode, the transmitting power of the downlink and uplink transmitters are reduced by 12 decibels. This reduction in transmitting power minimizes the interference to other subscriber terminals while still maintaining synchronization. The transmit rate remains at the low rate level to allow exchange of control information between central terminal 10 and subscriber terminal 20 over overhead channel 224.

When either an incoming or outgoing call is detected, a message is sent from the originating terminal to the destination terminal indicating that the downlink and uplink communication paths are required for the transmission of user traffic information. At this point, wireless telecommunication system 1 enters into the traffic mode. During the traffic mode, the transmitting power of both the downlink and uplink communication paths is increased to the high power level and the transmit rate is increased to the high rate level of 160 kilobits per second to facilitate information transfer between originating and destination terminals. Upon detection of call termination, a message is sent from the terminating terminal to the other terminal indicating that the downlink and uplink communication paths are no longer required. At this point, wireless telecommunication system 1 reenters the standby mode. Code synchronization and frame alignment tracking is performed in both the standby mode and the traffic mode.

Figure 18:
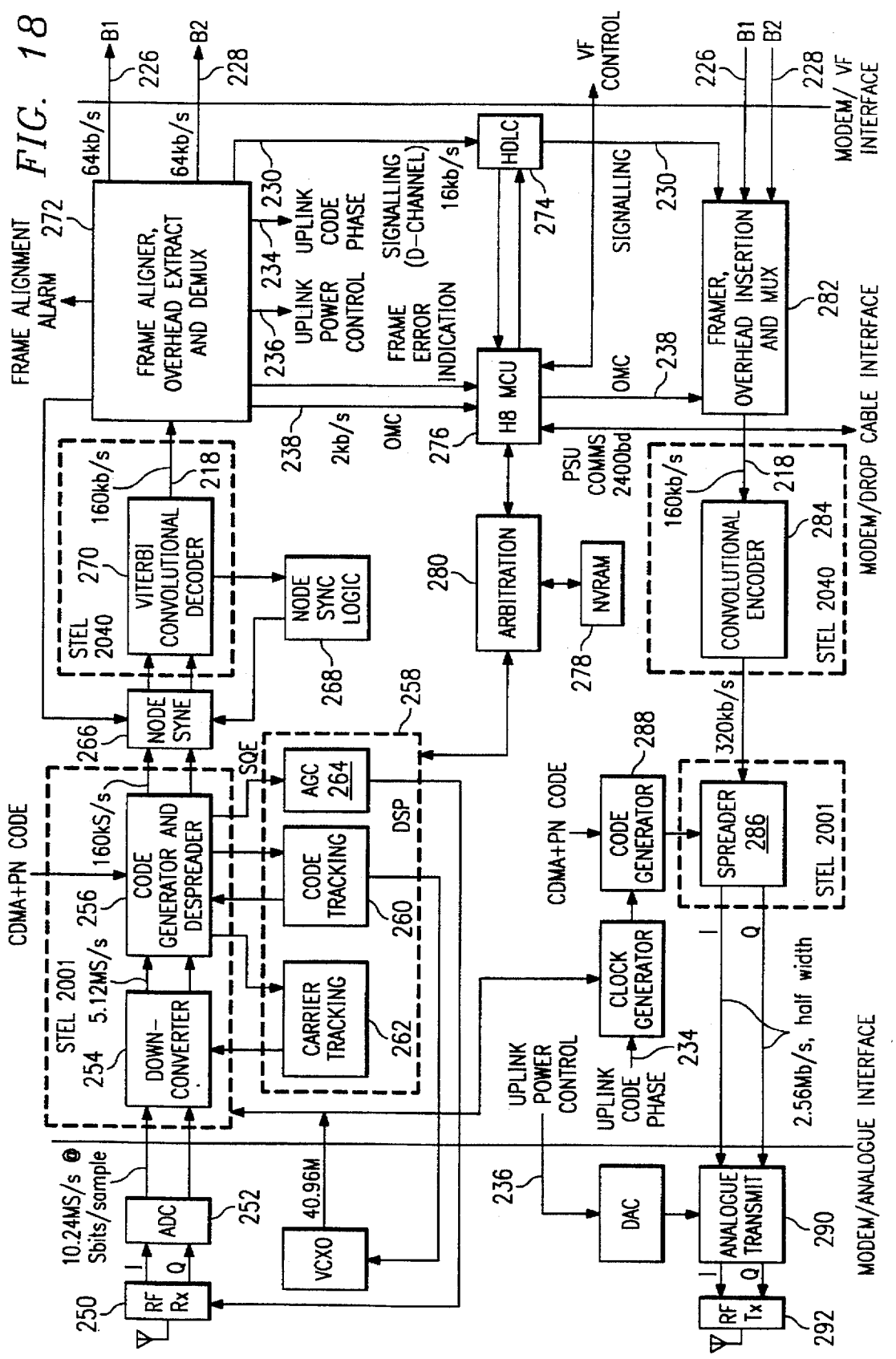
FIG. 18 is a schematic diagram illustrating the operation of the receiver and transmitter in the subscriber terminal.

FIG. 18 is a detailed block diagram of receiver 202 and transmitter 204 in subscriber terminal 20. Receiver 202 receives downlink signal 212 at an RF receive interface 250. RF receive interface 250 separates the spread spectrum signal into I and Q signal components. RF receive interface 250 band pass filters each of the I and Q signal components by removing portions above approximately half of receiver 202 bandwidth of 3.5 MegaHertz. RF receive interface 250 low pass filters the I and Q signal components to reject image frequencies and prevent signal aliasing. The I and Q signal components are placed into digital format by an analog to digital converter 252. The sampling frequency of analog to digital converter 252 is four times the chip period, or 10.24 MegaHertz, with an eight bit resolution.

The digital I and Q signal components are stepped to a rate of 5.12 MegaHertz by a down converter 254. A code generator and despreader 256 performs the synchronization acquisition and tracking functions previously described to synchronize the phase of the Rademacher-Walsh and pseudo-random noise code sequence of receiver 202 to that of downlink signal 212. A digital signal processor 258 controls the phase of the slave code sequence through a code tracker 260 and a carrier tracker 262. An automatic gain control unit 264 produces an automatic gain control signal to control the gain of RF receive interface 250. Code generator and despreader 256 generates the I and Q 160 kilobits per second of frame information for further synchronization by a node sync interface 266 under the control of a node sync logic unit 268. Node sync interface 266, through node sync logic unit 268, determines whether the I and Q channels should be swapped, as they may be received in four different ways.

Viterbi decoder 270 provides forward error correction on the I and Q channels and generates an error corrected 160 kilobits per second data signal after a 71 symbol delay. The error corrected signal is processed by a frame aligner and extractor 272 determines frame alignment and extracts power control signal 236, code synchronization 234, and operations and maintenance channel signal 238. Frame aligner and extractor 272 also extracts first user channel 226 and second user channel 228 for traffic transmission towards first user 208 and second user 210, and signaling channel 230 for processing by high level data link controller 274 and a microcontroller 276. Frame aligner and extractor 272 also provides alarm and error indications upon detecting a loss in frame alignment. A non-volatile random access memory 278 stores system parameter information for subsequent insertion through an arbitrator 280 in the event of link loss in order to facilitate link reestablishment. Arbitrator 280 also provides an interface between digital signal processor 258 and microcontroller 276.

In the transmit direction, a frame inserter 282 receives first user traffic and second first traffic from first user 208 and second user 210, signaling channel 230 information from high level data link controller 274, and operations and maintenance channel 238 information from microcontroller 276. Frame inserter generates frame information signal 218 for uplink signal 214 for processing by a convolutional encoder 284. Convolutional encoder 284 doubles the data rate of frame information signal 218 to provide forward error correction. A spreader 286 splits the 320 kilobits per second signal of convolutional encoder 284 into two 160 kilobits per second I and Q signals and exclusively ORs these signals with the spreading sequence generated by a code generator 288 in response to a system clock generated by clock generator 290 as adjusted by code synchronization signal 234. Code generator 288 generates one of sixteen Rademacher-Walsh functions exclusive ORed with a pseudo-random sequence having a pattern length of 256 with a chip rate of 2.56 MegaHertz. The pseudo-random sequence should match that of central terminal 10, but is adjustable under software control to provide reliable rejection of signals from other bands or other cells.

Spreader 286 supplies the I and Q signals to an analog transmitter 290. Analog transmitter 290 produces pulsed I and Q signals for an RF transmit interface 292. Transmit power is generated by first establishing a control voltage from a digital to analog converter in response to power control signal 236 extracted from overhead channel 224. This control voltage is applied to the power control inputs of analog transmitter 290 and RF transmit interface 292. Power control of 35 decibels is obtainable in both analog transmitter 290 and RF transmit interface 292. RF transmit interface 292 includes a step attenuator that provides 2 decibel steps of attenuation over a 30 decibel range. This attenuator is used to switch between high and low power levels. On power up, maximum attenuation is selected to minimize the transmitting power of transmitter 204.

Thus, it is apparent that there has been provided, in accordance with the present invention, an apparatus and method of synchronizing a transmitter in a subscriber terminal of a wireless telecommunications system that satisfies the advantages set forth above. Although the preferred embodiment has been described in detail, it should be understood that various changes, substitutions, and alterations can be made herein. For example, though the downlink and uplink signals have been described with a specific format and rate, other formats and rates may be implemented while providing a similar transmission of status, control, and information. Thus, although a particular embodiment has been described herein, it will be appreciated that the invention is not limited thereto and that many modifications and additions thereto may be made within the scope of the invention.

What is claimed is:

1. A method of synchronizing a transmitter in a subscriber terminal of a wireless telecommunications system, comprising the steps of:

establishing a downlink communication path from a central terminal to the subscriber terminal;

transmitting from a transmitter in the central terminal a downlink signal;

receiving at a receiver in the subscriber terminal the downlink signal;

identifying a code synchronization signal within the downlink signal;

comparing a code and phase of the code synchronization signal with a code and a phase of a slave code sequence in the subscriber terminal;

adjusting the phase of the slave code sequence to match the phase of the code synchronization signal;

establishing an uplink communication path in response to the phase of the transmitter in the subscriber terminal being equivalent to a phase of a receiver in the central terminal.

2. The method of claim 1, wherein the code synchronization signal adjusts the phase of the transmitter in the subscriber terminal in a coarse adjustment mode having one half increments of a chip period.

3. The method of claim 2, wherein the code synchronization signal adjusts the phase of the transmitter in the subscriber terminal either forward or backward in one half increments.

4. A method of synchronizing a transmitter in a subscriber terminal of a wireless telecommunications system, comprising the steps of:

establishing a downlink communication path from a central terminal to the subscriber terminal;

transmitting from a transmitter in the central terminal a downlink signal;

receiving at a receiver in the subscriber terminal the downlink signal identifying a code synchronization signal within the downlink signal;

adjusting a phase of the transmitter in the subscriber terminal in response to the code synchronization signal;

establishing an uplink communication path in response to the phase of the transmitter in the subscriber terminal being equivalent to a phase of a receiver in the central terminal;

transmitting an uplink signal from the transmitter in the subscriber terminal;

receiving the uplink signal at the receiver in the central terminal;

comparing a phase of the uplink signal to a phase of the receiver in the central terminal;

transmitting the code synchronization signal in response to the phase of the uplink signal not matching the phase of the receiver in the central terminal, the code synchronization signal having a value indicating that a further adjustment is to be made to the phase of the transmitter in the subscriber terminal.

5. The method of claim 4, wherein the comparing step includes measuring a combined power of the phase of the uplink signal and the phase of the receiver in the central terminal and determining a maximum combined power value that indicates a match between the phase of the uplink signal and the phase of the receiver in the central terminal.

6. A method according to claim 5, wherein the step of measuring combined power comprises performing a correlation operation between PN codes of an uplink signal and a receiver reference signal.

7. The method of claim 5, further comprising the steps of:

receiving the uplink signal at the receiver in the central terminal in phase with a phase of the receiver in the central terminal, receipt of the uplink signal matching the phase of the receiver in the central terminal indicating that a phase delay between the transmitter in the subscriber terminal and the receiver in the central terminal has been determined, determination of the phase delay indicating that an uplink communication path has been established from the subscriber terminal to the central terminal; and transmitting the code synchronization signal having a value indicating that no further adjustments are needed to the phase of the transmitter in the subscriber terminal.

8. The method of claim 7, further comprising the steps of:

continuously comparing the phase of the uplink signal from the transmitter of the subscriber terminal to the phase of the receiver in the central terminal;

transmitting the code synchronization signal having a value indicating that a slight readjustment is to be made to the phase of the transmitter in the subscriber terminal in response to a change in the path delay between the transmitter in the subscriber terminal and the receiver in the central terminal.

9. The method of claim 8, wherein the code synchronization signal adjusts the phase of the transmitter in the subscriber terminal in a fine adjustment mode having one sixteenth increments of a chip period in response to changes in the path delay between the transmitter in the subscriber terminal and the receiver in the central terminal.

10. The method of claim 9, wherein the code synchronization signal adjusts the phase of the transmitter in the subscriber unit either forward or backward by one sixteenth increments.

11. A method of synchronizing a transmitter in a subscriber terminal of a wireless telecommunications system, comprising the steps of:

establishing a downlink communication path from a central terminal to the subscriber terminal;

transmitting from a transmitter in the central terminal a downlink signal;

receiving at a receiver in the subscriber terminal the downlink signal identifying a code synchronization signal within the downlink signal;

adjusting a phase of the transmitter in the subscriber terminal in response to the code synchronization signal;

establishing an uplink communication path in response to the phase of the transmitter in the subscriber terminal being equivalent to a phase of a receiver in the central terminal;

monitoring the uplink communication path from the subscriber terminal to the central terminal;

resetting the phase of the transmitter in the subscriber terminal to a previous value in response to an interruption in the uplink communication path in order to facilitate reestablishment of the uplink communication path.

12. The method of claim 1, wherein the code synchronization signal is decoded within an overhead channel of the downlink signal.

13. The method of claim 12, wherein the overhead channel is decoded in one bit of every ten bit positions of the downlink signal.

14. A system for synchronizing communications in a wireless communications system, comprising:

a transmitter in a central terminal operable to transmit a downlink signal, the downlink signal including a code synchronization signal;

a receiver in a subscriber terminal operable to receive the downlink signal, the receiver in the subscriber terminal operable to extract the code synchronization signal from the downlink signal, the receiver operable to compare a code and phase of the code synchronization signal with a code and phase of a slave code sequence corresponding to the receiver, the receiver operable to adjust the phase of the slave code sequence such that the slave code sequence matches the phase of the code synchronization signal;

a transmitter in the subscriber terminal operable to transmit an uplink signal, the transmitter in the subscriber terminal operable to receive the code synchronization signal from the receiver in the subscriber terminal, the code synchronization signal operable to adjust a phase of the uplink signal;

a receiver in the central terminal operable to receive the uplink signal, the receiver in the subscriber terminal operable to compare its receiver phase to the phase of the uplink signal to determine a match between the receiver phase and the phase of the uplink signal, the receiver in the subscriber terminal operable to set a value for the code synchronization signal in order to obtain a match of the phase of the uplink signal to the receiver phase.

15. The system of claim 14, wherein the code synchronization signal is decoded within an overhead channel of the downlink signal.

16. The system of claim 15, wherein the overhead channel is decoded in one bit of every ten bit positions of the downlink signal.

17. The system of claim 14, wherein the code synchronization signal incrementally adjusts the phase of the uplink signal either forward or backward in a coarse adjustment mode having one half increments of a chip period.

18. A system for synchronizing communications in a wireless communications system, comprising:

a transmitter in a central terminal operable to transmit a downlink signal, the downlink signal including a code synchronization signal;

a receiver in a subscriber terminal operable to receive the downlink signal, the receiver in the subscriber terminal operable to extract the code synchronization signal from the downlink signal;

a transmitter in the subscriber terminal operable to transmit an uplink signal, the transmitter in the subscriber terminal operable to receive the code synchronization signal from the receiver in the subscriber terminal, the code synchronization signal operable to adjust a phase of the uplink signal;

a receiver in the central terminal operable to receive the uplink signal, the receiver in the subscriber terminal operable to compare its receiver phase to the phase of the uplink signal to determine a match between the receiver phase and the phase of the uplink signal, the receiver in the subscriber terminal operable to set a value for the code synchronization signal in order to obtain a match of the phase of the uplink signal to the receiver phase, wherein the receiver in the central terminal continuously compares the phase of the uplink signal to the receiver phase, the receiver altering the code synchronization signal in response to the comparison to maintain the match between the phase of the uplink signal and the receiver phase.

19. The system of claim 18, wherein the code synchronization signal incrementally adjusts the phase of the uplink signal either forward or backward in a fine adjustment mode having one sixteenth increments of a chip period.

20. A system for synchronizing communications in wireless communications system, comprising:

a transmitter in a central terminal operable to transmit a downlink signal, the downlink signal including a code synchronization signal;

a receiver in a subscriber terminal operable to receive the downlink signal, the receiver in the subscriber terminal operable to extract the code synchronization signal from the downlink signal;

a transmitter in the subscriber terminal operable to transmit an uplink signal, the transmitter in the subscriber terminal operable to receive the code synchronization signal from the receiver in the subscriber terminal, the code synchronization signal operable to adjust a phase of the uplink signal;

a receiver in the central terminal operable to receive the uplink signal, the receiver in the subscriber terminal operable to compare its receiver phase to the phase of the uplink signal to determine a match between the receiver phase and the phase of the uplink signal, the receiver in the subscriber terminal operable to set a value for the code synchronization signal in order to obtain a match of the phase of the uplink signal to the receiver phase, wherein the receiver in the central terminal measures a combined power of the phase of the uplink signal and the phase of the receiver in the central terminal, the receiver in the central terminal determining a maximum combined power value that indicates a match between the phase of the uplink signal and the phase of the receiver in the central terminal.

21. A subscriber terminal in a wireless telecommunications system, comprising:

a receiver operable to receive a downlink signal, the downlink signal including a code synchronization signal, the receiver operable to extract the code synchronization signal from the downlink signal, the receiver operable to compare a code and phase of the code synchronization signal with a code and phase of a slave code sequence corresponding to the receiver, the receiver operable to adjust the phase of the slave code sequence such that the slave code sequence matches the phase of the code synchronization signal;

a transmitter operable to transmit an uplink signal, the transmitter operable to receive the code synchronization signal, the code synchronization signal operable to adjust a phase of the uplink signal.

22. The subscriber terminal of claim 21, wherein the code synchronization signal is decoded within an overhead channel of the downlink signal.

23. The subscriber terminal of claim 22, wherein the overhead channel is decoded into one bit of every ten bit positions of the downlink signal.

24. The subscriber terminal of claim 21, wherein the code synchronization signal incrementally adjusts the phase of the uplink signal either forward or backward in a coarse adjustment mode having one half increments of a chip period.

25. The subscriber terminal of claim 21, wherein the code synchronization signal incrementally adjusts the phase of the uplink signal either forward or backward in a fine adjustment mode having one sixteenth increments of a chip period.

* * * * *